(12) United States Patent
Nakashima et al.

(10) Patent No.: US 11,118,915 B2
(45) Date of Patent: Sep. 14, 2021

(54) POSITION ESTIMATION DEVICE, MOVING-OBJECT CONTROL SYSTEM, POSITION ESTIMATION METHOD, AND COMPUTER PROGRAM PRODUCT

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Ryo Nakashima, Kawasaki (JP); Akihito Seki, Yokohama (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 0 days.

(21) Appl. No.: 16/801,297

(22) Filed: Feb. 26, 2020

(65) Prior Publication Data

US 2021/0072030 A1 Mar. 11, 2021

(30) Foreign Application Priority Data

Sep. 11, 2019 (JP) .............................. JP2019-165633

(51) Int. Cl.
*G01C 21/30* (2006.01)
*G06T 7/70* (2017.01)
*G06K 9/00* (2006.01)

(52) U.S. Cl.
CPC .......... *G01C 21/30* (2013.01); *G06K 9/00791* (2013.01); *G06T 7/70* (2017.01);
(Continued)

(58) Field of Classification Search
CPC .............. G01C 21/30; G06K 9/00791; G06K 9/00664; G06T 7/70; G06T 2207/30244; G06T 2207/30252; H04L 25/021
(Continued)

(56) References Cited

U.S. PATENT DOCUMENTS 8,259,994 B1\* 9/2012 Anguelov .......... G06K 9/00664
382/100
9,701,305 B2\* 7/2017 Paul ..................... G05D 1/0016
(Continued)

FOREIGN PATENT DOCUMENTS

JP 6061770 B2 1/2017
JP 2017-224071 A 12/2017

OTHER PUBLICATIONS

Okatani, T., "Bundle Adjustment: 4.3.4 Calculation of the precision of the maximum likelihood estimator," IPSJ SIG Technical Report, vol. 2009-CVIM-167, No. 37, Jun. 10, 2009, (with English translation), 17 pages.
(Continued)

Primary Examiner — Marnie A Matt
(74) Attorney, Agent, or Firm — Oblon, McClelland, Maier & Neustadt, L.L.P.

(57) ABSTRACT

A position estimation device according to an embodiment of the present disclosure is provided for estimating a self-position of a moving object device provided with one or more sensors for observing information related to movement. The position estimation device includes one or more hardware processors configured to: estimate a state amount representing a state of each of the one or more sensors based on an observation value of the corresponding sensor; calculate a confidence degree representing a degree of confidence of the state amount of each of the one or more sensors; select one or more target sensors from among the one or more sensors based on the confidence degree of the state
(Continued)

amount of each of the one or more sensors; and estimate the self-position based on the observation value and the state amount of each of the selected one or more target sensors.

19 Claims, 8 Drawing Sheets

(52) U.S. Cl.
CPC ............... *G06K 9/00664* (2013.01); *G06T 2207/30244* (2013.01); *G06T 2207/30252* (2013.01)

(58) Field of Classification Search
USPC .......................................................... 348/113
See application file for complete search history.

(56) References Cited

U.S. PATENT DOCUMENTS

| | | | | |
|---|---|---|---|---|
| 10,742,449 | B1* | 8/2020 | Avner | H04L 25/0222 |
| 2012/0083960 | A1* | 4/2012 | Zhu | G05D 1/0276 701/23 |
| 2013/0231824 | A1* | 9/2013 | Wilson | G01C 21/3415 701/26 |
| 2015/0071356 | A1* | 3/2015 | Kim | H04N 19/187 375/240.16 |
| 2016/0353099 | A1* | 12/2016 | Thomson | G01C 21/206 |
| 2017/0280129 | A1* | 9/2017 | Mirota | G06T 7/593 |
| 2017/0356756 | A1* | 12/2017 | Takatani | G01C 22/00 |
| 2018/0068459 | A1* | 3/2018 | Zhang | G06T 7/60 |
| 2018/0373980 | A1* | 12/2018 | Huval | G06K 9/00805 |
| 2019/0007670 | A1* | 1/2019 | Sakurai | G06T 7/536 |
| 2019/0025853 | A1* | 1/2019 | Julian | G06T 7/74 |
| 2019/0050000 | A1* | 2/2019 | Kennedy | G06T 7/277 |
| 2019/0080476 | A1* | 3/2019 | Ermilios | G06T 7/50 |
| 2019/0138825 | A1* | 5/2019 | Lee | G06K 9/00825 |
| 2019/0263420 | A1* | 8/2019 | Nanri | G01S 7/4808 |
| 2019/0265040 | A1* | 8/2019 | Takano | G01C 21/3602 |
| 2019/0273909 | A1* | 9/2019 | Ye | G01B 11/14 |
| 2019/0323852 | A1* | 10/2019 | Ondruska | G06K 9/62 |
| 2019/0337509 | A1* | 11/2019 | Shalev-Shwartz | B60W 60/00274 |
| 2020/0019792 | A1* | 1/2020 | Sano | G06T 7/73 |
| 2020/0124421 | A1* | 4/2020 | Kang | G01C 21/165 |
| 2020/0219283 | A1* | 7/2020 | Nishikawa | G06T 7/0002 |
| 2020/0288135 | A1* | 9/2020 | Laroche | H04N 19/117 |

OTHER PUBLICATIONS

Leutenegger, S. et al., "Keyframe-Based Visual-Inertial SLAM Using Nonlinear Optimization," Proceedings of Robotics Science and Systems (RSS), 2013, 8 pages.

Leutenegger, S. et al., "Keyframe-Based Visual-Inertial Odometry Using Nonlinear Optimization," International Journal of Robotics Research, vol. 34, No. 3, 2015, 26 pages.

Mur-Artal, R. et al., "Visual-Inertial Monocular SLAM With Map Reuse," IEEE Robotics and Automation Letters, vol. 2, No. 2, Apr. 2017, pp. 796-803.

Qin, T. et al., "VINS-Mono: A Robust and Versatile Monocular Visual-Inertial State Estimator," IEEE Transactions on Robotics, vol. 34, No. 4, Aug. 2018, pp. 1004-1020.

Von Stumberg, L. et al., "Direct Sparse Visual-Inertial Odometry using Dynamic Marginalization," 2018 IEEE International Conference on Robotics and Automation (ICRA), May 21-25, 2018, pp. 2510-2517.

Martinelli, A., "Closed-form solution of visual-inertial structure from motion," International Journal of Computer Vision, vol. 106, No. 2, https://hal.archives-ouvertes.fr/hal-00905881, Nov. 18, 2013, 17 pages.

Lynen, S. et al., "A Robust and Modular Multi-Sensor Fusion Approach Applied to MAV Navigation," 2013 IEEE/RSJ International Conference on Intelligent Robots and Systems (IROS), Nov. 3-7, 2013, pp. 3923-3929.

Mourikis, A. I. et al., "A Multi-State Constraint Kalman Filter for Vision-aided Inertial Navigation," 2007 IEEE International Conference on Robotics and Automation, Apr. 10-14, 2007, pp. 3565-3572.

Kaiser, J. et al., "Simultaneous State Initialization and Gyroscope Bias Calibration in Visual Inertial Aided Navigation," IEEE Robotics and Automation Letters, vol. 2, No. 1, Jan. 1, 2017, pp. 18-25.

Campos, C. et al., "Fast and Robust Initialization for Visual-Inertial SLAM," 2019 International Conference on Robotics and Automation (ICRA), May 20-24, 2019, pp. 1288-1294.

Keivan, N. et al., "Asynchronous Adaptive Conditioning for Visual-Inertial SLAM," International Symposium on Experimental Robotics (ISER), vol. 34, No. 13, 2015, 13 pages.

Nobre, F. et al., "Drift-Correcting Self-Calibration for Visual-Inertial SLAM," 2017 IEEE International Conference on Robotics and Automation (ICRA), May 29-Jun. 3, 2017, pp. 6525-6532.

Forster, C. et al., "IMU Preintegration on Manifold for Efficient Visual-Inertial Maximum-a-Posteriori Estimation," Robotics: Science and Systems, 2015, 10 pages.

Tardif, J.-P., et al.. "A New Approach to Vision-Aided Inertial Navigation", (IROS), 2010 IEEE/RSJ International Conference on Intelligent Robots and Systems, IEEE,Oct. 18, 2010 (Oct. 18, 2010), pp. 4161-4168, XP031920563.

Panahandeh, G., et al., "Vision-Aided Inertial Navigation Based on Ground Plane Feature Detection", IEEE / ASME Transactions on Mechatronics, IEEE Service Center. vol. 19, No. 4, Aug. 2014 (Aug. 2014), pp. 1206-1215, XP011546570.

Chermak, L., et al., "Real-time smart and standalone vision / IMU navigation sensor", Journal of Real-Time Image Processing, vol. 16, No. 4, Jun. 22, 2016 (Jun. 22, 2016), pp. 1189-1205, XP036848172.

* cited by examiner

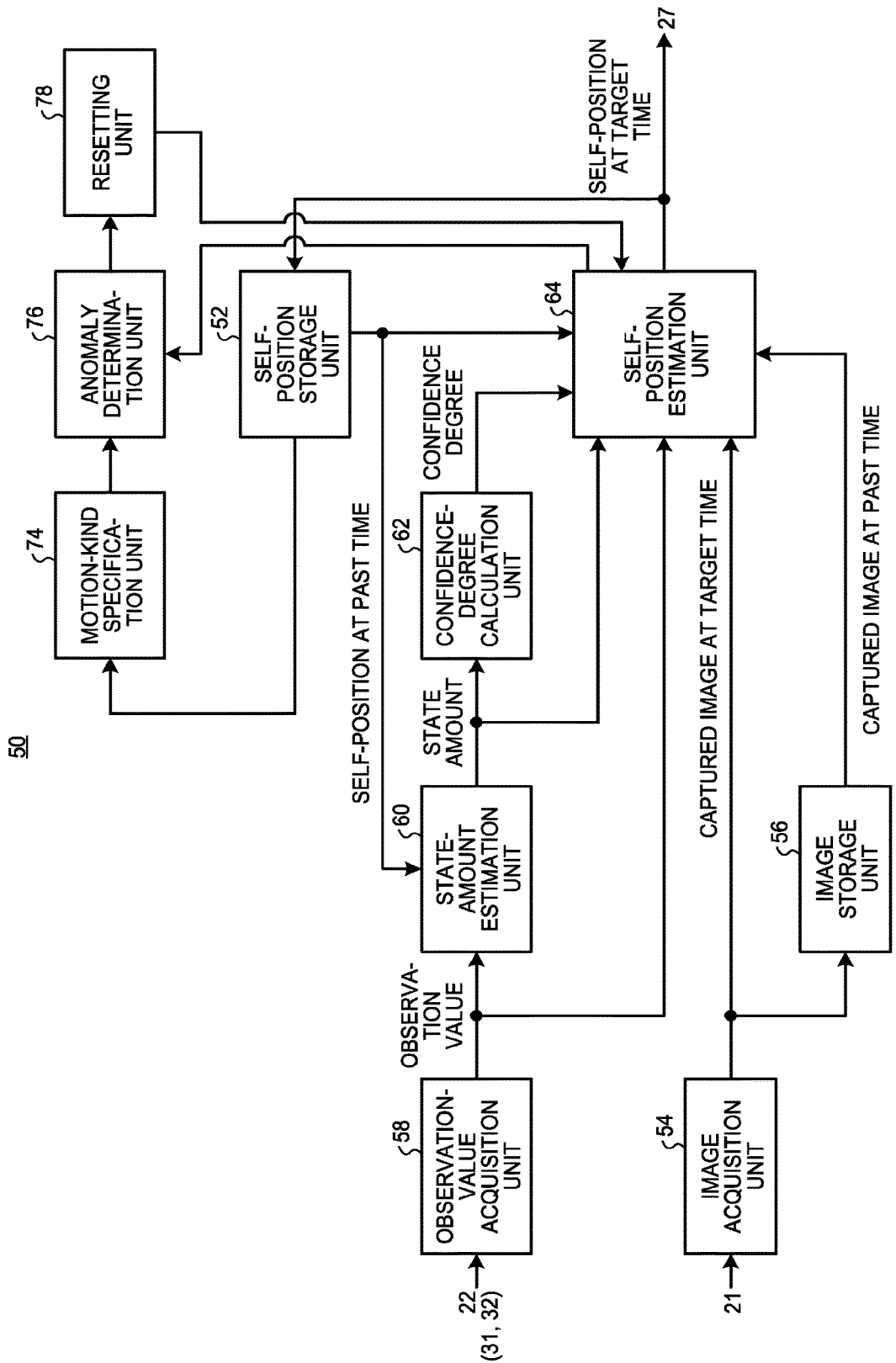

POSITION ESTIMATION DEVICE, MOVING-OBJECT CONTROL SYSTEM, POSITION ESTIMATION METHOD, AND COMPUTER PROGRAM PRODUCT

CROSS-REFERENCE TO RELATED APPLICATIONS

This application is based upon and claims the benefit of priority from Japanese Patent Application No. 2019-165633, filed on Sep. 11, 2019; the entire contents of which are incorporated herein by reference.

FIELD

Embodiments described herein relate generally to a position estimation device, a moving-object control system, a position estimation method, and a computer program product.

BACKGROUND

A position estimation device configured to estimate the self-position of an image capturing device has been known. The position estimation device estimates the self-position by using an image captured by the image capturing device and an observation value observed by a sensor attached to the image capturing device. The position estimation device sometimes estimates the self-position by using a state amount representing the state of the sensor in addition to the observation value observed by the sensor. For example, the state amount of an angular velocity sensor is a bias included in the angular velocity. The state amount of an acceleration sensor includes a bias included in the acceleration, the gravitational acceleration, and the speed.

The position estimation device estimates the state amount of a sensor based on the observation value observed by the sensor. However, the accuracy of the estimated state amount changes depending on a trajectory of the sensor and the like. For example, when constant speed linear motion is performed, the observation value of an acceleration sensor is substantially constant. Thus, the accuracies of the acceleration bias, the gravitational acceleration, and the speed decreases in such a case. The accuracy of the self-position estimation degrades when the position estimation device uses such a state amount having low accuracy.

BRIEF DESCRIPTION OF THE DRAWINGS

FIG. 9 is a configuration diagram of the position estimation device according to a modification.

DETAILED DESCRIPTION

A position estimation device according to an embodiment of the present disclosure is provided for estimating a self-position of a moving object device provided with one or more sensors for observing information related to movement. The position estimation device includes one or more hardware processors configured to: estimate a state amount representing a state of each of the one or more sensors based on an observation value of the corresponding sensor; calculate a confidence degree representing a degree of confidence of the state amount of each of the one or more sensors; select one or more target sensors from among the one or more sensors based on the confidence degree of the state amount of each of the one or more sensors; and estimate the self-position based on the observation value and the state amount of each of the selected one or more target sensors.

The following describes an embodiment of the present invention with reference to the accompanying drawings.

Figure 1:
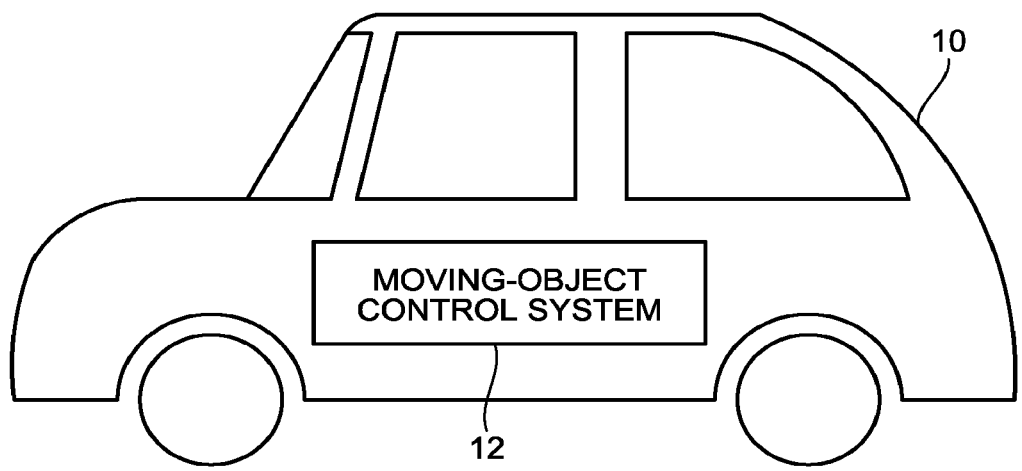
FIG. 1 is a diagram illustrating a moving object according to an embodiment.

FIG. 1 is a diagram illustrating a moving object device 10 according to an embodiment. In the present embodiment, the moving object device 10 is a vehicle such as an automobile or a motorcycle. However, the moving object device 10 is not limited to a vehicle but may be any device that can move by itself or is portable by a person, a robot, or the like. For example, the moving object device 10 may be a robot, a ship, or a flying object such as a drone.

A moving-object control system 12 is mounted on the moving object device 10. The moving-object control system 12 is, for example, a device including a dedicated or general-purpose computer. An information processing function of the moving-object control system 12 may not be mounted on the moving object device 10 but may be mounted on a device such as a cloud connected with the moving object device 10 through a network.

Figure 2:
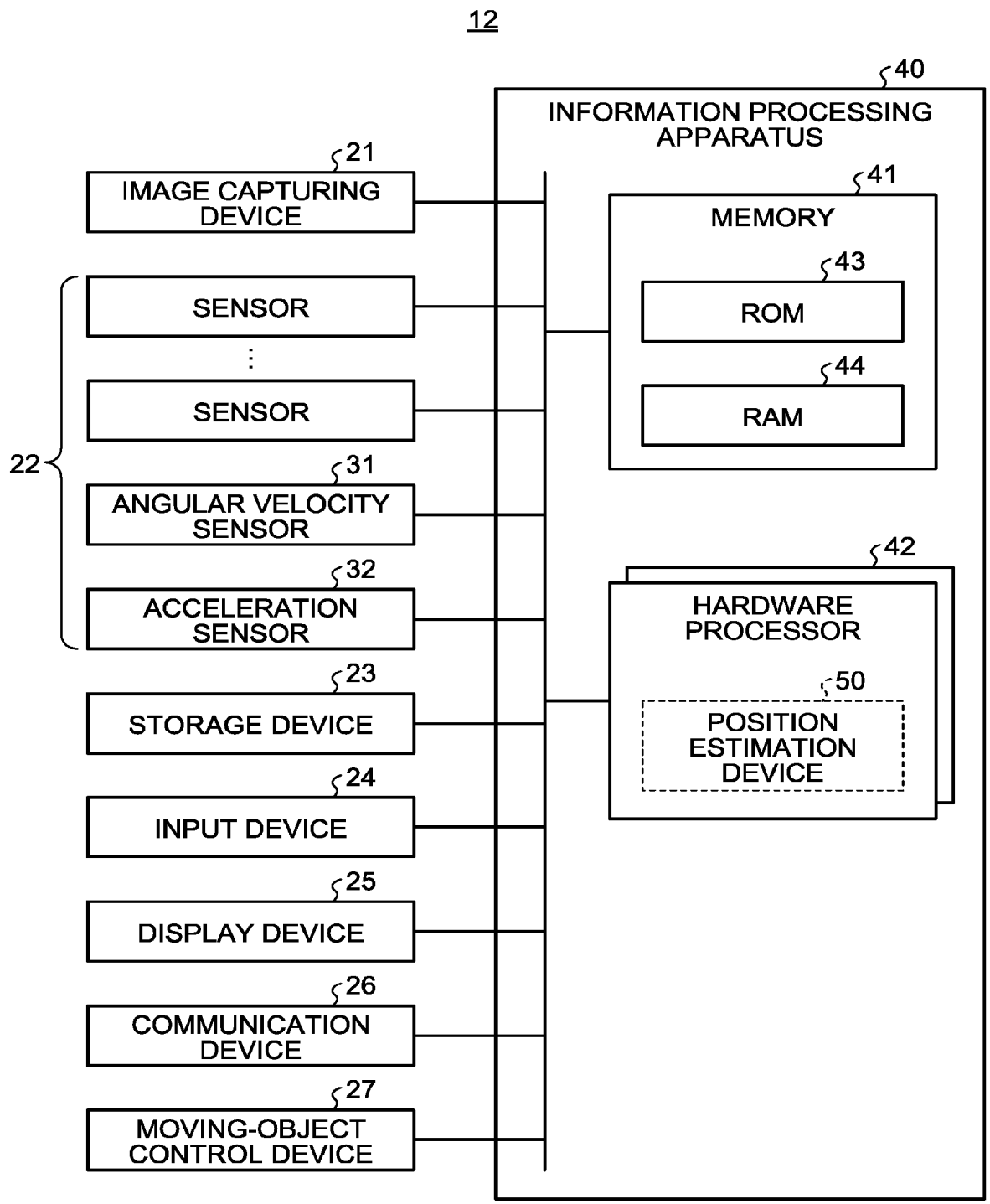
FIG. 2 is a configuration diagram of a moving-object control system.

FIG. 2 is a diagram illustrating an exemplary configuration of the moving-object control system 12 according to the embodiment. The moving-object control system 12 includes an image capturing device 21, one or more sensors 22, a storage device 23, an input device 24, a display device 25, a communication device 26, a moving-object control device 27, and an information processing apparatus 40.

The image capturing device 21 is attached to the moving object device 10. In a fixed pose at a fixed position on the moving object device 10, the image capturing device 21 captures an image of vicinity of the moving object device 10. The pose of the image capturing device 21 does not need to be fixed as long as its pose relative to the moving object device 10 can be measured. In the present embodiment, the image capturing device 21 is a monocular camera. The image capturing device 21 may be a stereo camera or a depth camera. Alternatively, the image capturing device 21 may be a camera having a predetermined field of view or an omnidirectional camera. The image capturing device 21 generates a captured image through image capturing of vicinity of the moving object device 10 at each predetermined time interval.

The one or more sensors 22 are attached to the moving object device 10. Each of the one or more sensors 22 is attached, for example, in a fixed pose to a fixed position on the moving object device 10. Each of the one or more sensors 22 observes information related to movement of the moving object device 10.

In the present embodiment, the sensors 22 include an angular velocity sensor 31 and an acceleration sensor 32.

The angular velocity sensor 31 detects the angular velocity of the moving object device 10 as an observation value. The angular velocity sensor 31 detects an X-directional component, a Y-directional component, and a Z-directional component of the angular velocity. The X-directional component, the Y-directional component, and the Z-directional component are orthogonal to each other.

The acceleration sensor 32 detects the acceleration of the moving object device 10 as an observation value. The acceleration sensor 32 detects an X-directional component, a Y-directional component, and a Z-directional component of the acceleration.

The one or more sensors 22 may include a sensor other than the angular velocity sensor 31 and the acceleration sensor 32. For example, the one or more sensors 22 may include a speed sensor configured to detect the speed of the moving object device 10, and a position sensor configured to detect the position of the moving object device 10 based on signals from satellites or the like. In addition, the one or more sensors 22 may include a distance sensor, such as a LiDAR, configured to measure the distance to an object around the moving object device 10, sonar configured to detect an object around the moving object device 10 with sound wave, a geomagnetic sensor, or the like.

The storage device 23 is, for example, a semiconductor memory element such as a hard disk drive, an optical disk drive, or a flash memory. The storage device 23 stores computer programs executed by the moving-object control system 12 and data used by the moving-object control system 12.

The input device 24 receives instruction and information input by a user. The input device 24 is, for example, a pointing device such as an operation panel, a mouse, or a trackball, or an input device such as a keyboard.

The display device 25 displays various kinds of information to the user. The display device 25 is, for example, a display device such as a liquid crystal display device. The communication device 26 transmits and receives information to and from an external device through wireless communication.

The moving-object control device 27 controls a drive mechanism for moving the moving object device 10. For example, when the moving object device 10 is an automated driving vehicle, the moving-object control device 27 determines the status of the vicinity based on information obtained from the information processing apparatus 40 and other information, and controls an acceleration amount, a brake amount, a steering angle, and the like.

The information processing apparatus 40 is, for example, one or more dedicated or general-purpose computers. The information processing apparatus 40 manages and controls the image capturing device 21, the one or more sensors 22, the storage device 23, the input device 24, the display device 25, the communication device 26, and the moving-object control device 27. The information processing apparatus 40 includes a memory 41 and one or more hardware processors 42.

The memory 41 includes, for example, a read only memory (ROM 43) and a random access memory (RAM 44). The ROM 43 stores computer programs, various kinds of setting information, and the like used for control of the information processing apparatus 40 in a non-rewritable manner. The RAM 44 is a transitory storage medium such as a synchronous dynamic random access memory (SDRAM). The RAM 44 functions as a work area of the one or more hardware processors 42.

The one or more hardware processors 42 are connected with the memory 41 (the ROM 43 and the RAM 44) over a bus. For example, the one or more hardware processors 42 may include one or more central processing units (CPUs), and may include one or more graphics processing units (GPUs). In addition, the one or more hardware processors 42 may include, for example, a semiconductor device including a dedicated processing circuit for achieving a neural network.

The one or more hardware processors 42 function as a position estimation device 50 by executing various kinds of processing through cooperation with various computer programs stored in the ROM 43 or the storage device 23 in advance by using the RAM 44 as the work area. The position estimation device 50 will be described below in detail.

Figure 3:
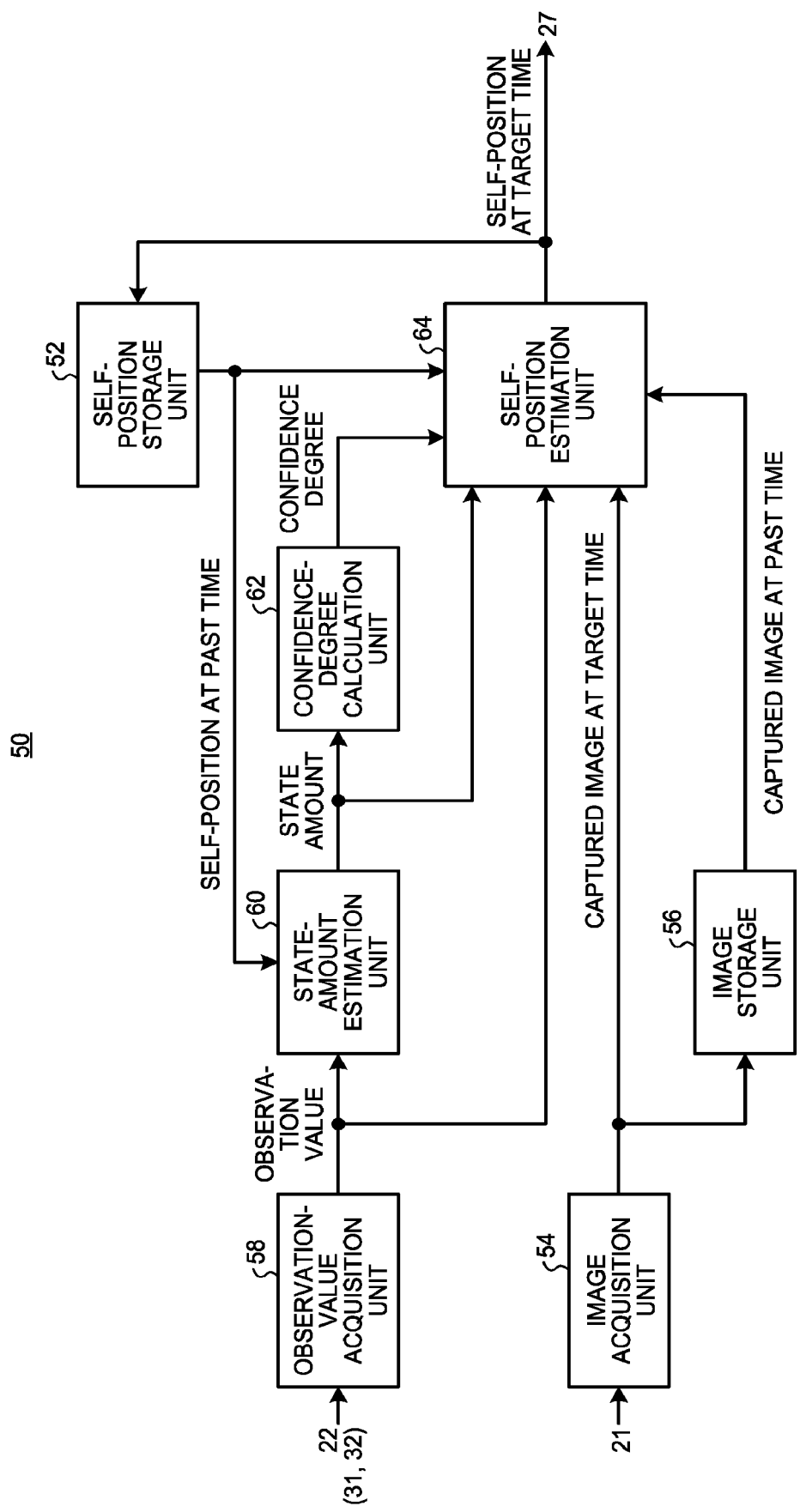
FIG. 3 is a configuration diagram of a position estimation device.

FIG. 3 is a diagram illustrating the configuration of the position estimation device 50. The position estimation device 50 estimates the self-position of the moving object device 10. More specifically, the moving object device 10 estimates a translation component of the self-position and a rotation component of the self-position.

The translation component of the self-position represents the coordinates (X-directional position, Y-directional position, and Z-directional position) of the moving object device 10 in the three-dimensional space. For example, the translation component of the self-position represents distances (X-directional distance, Y-directional distance, and Z-directional distance) from an optional reference point. The optional reference point may be, for example, the translation component of the self-position of the moving object device 10 at a predetermined time such as a start time.

The rotation component of the self-position represents the pose (rotation angle about an X axis, rotation angle about a Y axis, and rotation angle about a Z axis) of the moving object device 10. The rotation component may be an angle difference from an optional reference rotation angle. The optional reference rotation angle may be, for example, the rotation component of the self-position of the moving object device 10 at a predetermined time such as a start time. The rotation component may be expressed by, for example, a rotation matrix, a vector representing a rotational axis and a rotational direction, or a quaternion.

The position estimation device 50 estimates the self-position at each predetermined time interval. A time at which the self-position is to be estimated is referred to as a target time. A time before the target time, at which the self-position has already been estimated is referred to as a past time.

The position estimation device 50 includes a self-position storage unit 52, an image acquisition unit 54, an image storage unit 56, an observation-value acquisition unit 58, a state-amount estimation unit 60, a confidence-degree calculation unit 62, and a self-position estimation unit 64.

The self-position storage unit 52 stores the self-position at each of one or more past times. The image acquisition unit 54 acquires captured images captured by the image capturing device 21 at the target time. The image storage unit 56 stores captured images captured by the image capturing device 21 at one or more past times.

The observation-value acquisition unit 58 acquires an observation value observed by each of the one or more sensors 22. The observation-value acquisition unit 58 acquires the observation value, for example, in a temporally sequential manner. In the present embodiment, the observation-value acquisition unit 58 acquires the angular velocity observed by the angular velocity sensor 31 and the acceleration observed by the acceleration sensor 32 as observation values.

The state-amount estimation unit 60 estimates a state amount representing the state of each of the one or more sensors 22. In the present embodiment, the state-amount estimation unit 60 estimates, as the state amount representing the state of the angular velocity sensor 31, an angular velocity bias representing the bias of the angular velocity sensor 31. More specifically, the state-amount estimation unit 60 estimates an X-directional component, a Y-directional component, and a Z-directional component of the angular velocity bias.

In addition, in the present embodiment, the state-amount estimation unit 60 estimates, as the state amount representing the state of the acceleration sensor 32, the speed of the moving object device 10 in the translation direction, the gravitational acceleration, and an acceleration bias representing the bias of the acceleration sensor 32. More specifically, the state-amount estimation unit 60 estimates an X-directional component, a Y-directional component, and a Z-directional component of each of the speed, the gravitational acceleration, and the acceleration bias.

The state-amount estimation unit 60 may also estimate, as the state amount of the angular velocity sensor 31, for example, a positional difference amount between the image capturing device 21 and the angular velocity sensor 31 and a time stamp difference between the image capturing device 21 and the angular velocity sensor 31. The state-amount estimation unit 60 may also estimate, as the state amount of the acceleration sensor 32, for example, a position difference amount between the image capturing device 21 and the acceleration sensor 32 and a time stamp difference between the image capturing device 21 and the acceleration sensor 32. The state-amount estimation unit 60 may also estimate, as the state amount of each of the one or more sensors 22, a position difference amount between the sensor 22 and the image capturing device 21, a positional difference amount between the sensor 22 and a particular sensor 22, a time stamp difference between the sensor 22 and the image capturing device 21, and a time stamp difference between the sensor 22 and a particular sensor 22.

The position estimation device 50 can reduce degradation of the accuracy of the self-position estimation, which occurs due to change of the position of the sensor 22, by estimating, as the state amount of the sensor 22, the position difference amount between the sensor 22 and the image capturing device 21 or the positional difference amount between the sensor 22 and a particular sensor 22. The position estimation device 50 can also reduce degradation of the accuracy of the self-position estimation, which occurs due to variation of the time stamp of the sensor 22, by estimating, as the state amount of the sensor 22, the time stamp difference between the sensor 22 and the image capturing device 21 or the time stamp difference between the sensor 22 and a particular sensor 22.

The position estimation device 50 may estimate, as the state amount, a ratio of the translation component of the self-position estimated at a past time and the magnitude in the real world. Thereby, the position estimation device 50 can reduce degradation of the accuracy of the self-position estimation, which occurs due to deviation of the magnitude of the translation component of the self-position from the magnitude in the real world.

For example, for each of the one or more sensors 22, the state-amount estimation unit 60 estimates the state amount with which the residual error of a predetermined relational expression is minimized, the residual error being obtained when the self-position at each of one or more past times is substituted into the predetermined relational expression. The predetermined relational expression is an equation for calculating the self-position at the target time based on the self-position, the observation value of the corresponding sensor 22, and the state amount of the corresponding sensor 22 at the past time, and the time difference between the past time and the target time. For example, the predetermined relational expression is a motion equation for calculating the self-position at the target time based on the self-position at the past time.

The state-amount estimation unit 60 estimates, by, for example, a non-linear least-square method, the state amount with which the residual error of the predetermined relational expression is minimized. When the state amount changes in time, the state-amount estimation unit 60 estimates the state amount with which the residual error is minimized by repeatedly substituting the self-position at each of a plurality of past times into the predetermined relational expression by using, for example, a Levenberg-Marquardt method, a Gauss-Newton method, or a conjugate gradient method. When repeatedly substituting the self-position at each of a plurality of past times into the predetermined relational expression, the state-amount estimation unit 60 may unify the magnitude of the residual error by changing a weight for each past time. An exemplary method of estimating the state amounts of the angular velocity sensor 31 and the acceleration sensor 32 will be further described later with reference to FIG. 4.

The confidence-degree calculation unit 62 calculates a confidence degree representing the confidence of the state amount of each of the one or more sensors 22. When the value of the confidence degree is large, the degree of reliance and accuracy of the estimated state amount are high. When the value is small, the degree of reliance and accuracy of the estimated state amount are low.

For example, the confidence-degree calculation unit 62 calculates, as the confidence degree of the state amount, reciprocal of an expectation value of error of the state amount. The expectation value of error of the state amount can be obtained through, for example, calculation for minimizing the residual error when the state-amount estimation unit 60 estimates the state amount.

When the residual error is minimized by, for example, the non-linear least-square method, the state-amount estimation unit 60 estimates a covariance matrix of the state amount. For example, the state-amount estimation unit 60 estimates a covariance matrix of the X-directional component, the Y-directional component, and the Z-directional component of the state amount. In this case, the confidence-degree calculation unit 62 acquires the covariance matrix of the state amount from the state-amount estimation unit 60. Then, the confidence-degree calculation unit 62 calculates, as the confidence degree, the reciprocal of the sum of diagonal components of the acquired covariance matrix. When the sum of diagonal components of the covariance matrix is small, the error of the state amount is expected to be small and the accuracy thereof is high. When the sum is large, the error of the state amount is expected to be large and the accuracy thereof is low.

The moving object device 10 may include a second sensor configured to observe an observation value corresponding to the state amount. In this case, the confidence-degree calculation unit 62 may calculate the confidence degree by comparing the observation value of the second sensor and the estimated state amount. For example, in a case in which the speed is estimated as the state amount and the moving object device 10 includes a speed meter configured to check the speed based on the rotation speed of a wheel, the confidence-degree calculation unit 62 calculates the confidence degree to be high when the observation value of the speed meter and the estimated speed are close to each other, or calculates the confidence degree to be low when the observation value and the estimated speed are far from each other.

When a possible range of the state amount is predicted, the confidence-degree calculation unit 62 may calculate, as the confidence degree, the degree of match of the estimated state amount with a value or range set in advance. For example, possible ranges of the angular velocity bias of the angular velocity sensor 31 and the acceleration bias of the acceleration sensor 32 can be predicted by evaluating characteristics thereof or the like in advance. Thus, the confidence-degree calculation unit 62 may calculate, as the confidence degree, the degrees of match of the estimated angular velocity bias and the estimated acceleration bias with the predicted ranges. The direction of the gravitational acceleration can be predicted based on attachment pose of the acceleration sensor 32 relative to the ground. Thus, the confidence-degree calculation unit 62 may calculate, as the confidence degree, the degree of match of an estimated direction of the gravitational acceleration with the predicted direction of the gravitational acceleration.

The self-position estimation unit 64 selects one or more target sensors from among the one or more sensors 22 based on the confidence degree of the state amount of each of the one or more sensors 22. For example, the self-position estimation unit 64 selects, as target sensors from among the one or more sensors 22, one or more sensors 22 whose confidence degrees of the state amounts are equal to or higher than a predetermined threshold. Then, the self-position estimation unit 64 estimates the self-position based on the observation value and the state amount of each of the one or more selected target sensors.

For example, the self-position estimation unit 64 estimates the self-position at the target time based on: a captured image captured by the image capturing device 21 at the target time; a captured image at a past time; the self-position at the past time; and the observation value and the state amount of each of the one or more selected target sensors. When the one or more sensors 22 include none of the one or more target sensors whose confidence degrees of the state amounts are equal to or higher than the threshold, the self-position estimation unit 64 may estimate the self-position without using the observation value and the state amount of the sensors 22. Specifically, in this case, the self-position estimation unit 64 estimates the self-position at the target time based on the captured image at the target time, the captured image at the past time, and the self-position at the past time. The estimation processing performed by the self-position estimation unit 64 will be described in more detail with reference to FIG. 5 and the subsequent drawings.

Then, the self-position estimation unit 64 outputs the estimated self-position at the target time. For example, the self-position estimation unit 64 outputs the estimated self-position at the target time to the moving-object control device 27. The moving-object control device 27 acquires the self-position estimated at each predetermined time interval. The moving-object control device 27 controls movement of the moving object device 10 based on the estimated self-position.

Figure 4:
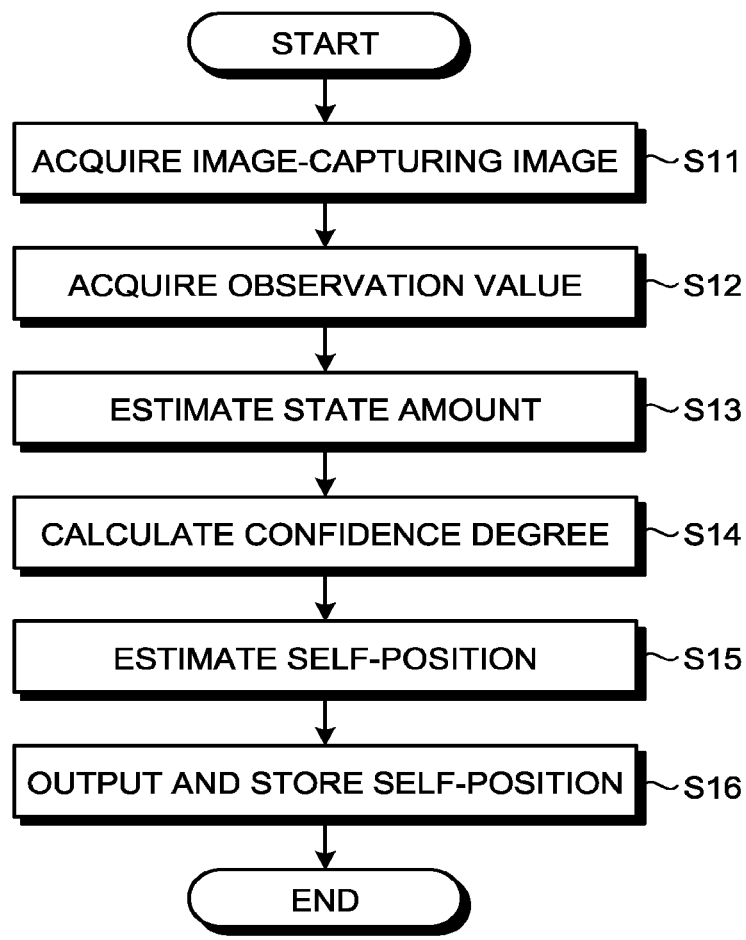
FIG. 4 is a flowchart illustrating the process of processing at the position estimation device.

FIG. 4 is a flowchart illustrating the process of processing at the position estimation device 50. The position estimation device 50 estimates the self-position at the target time by executing the processing illustrated in FIG. 4 at each predetermined time interval.

Firstly, at S11, the image acquisition unit 54 acquires the captured image at the target time. Subsequently, at S12, the observation-value acquisition unit 58 acquires the observation value observed by each of the one or more sensors 22. For example, the observation-value acquisition unit 58 acquires the observation value measured in synchronization with the image-capturing timing of the captured image at the target time.

Subsequently, at S13, the state-amount estimation unit 60 estimates the state amount representing the state of each of the one or more sensors 22. In the present embodiment, the state-amount estimation unit 60 estimates, as the state amount representing the state of the angular velocity sensor 31, the angular velocity bias representing the bias of the angular velocity sensor 31.

For example, the state-amount estimation unit 60 estimates the angular velocity bias with which a residual error (first residual error) is minimized. The residual error is obtained when the rotation component of the self-position at the past time is substituted into a rotation-component motion equation. The rotation-component motion equation is a relational expression for calculating the rotation component of the self-position at the target time based on the rotation component of the self-position at the past time.

Specifically, the rotation-component motion equation is expressed by Expression (1) below:

$$R(t+\Delta t)=R(t)\times \mathrm{Exp}((\omega(t)-b_g)\Delta t) \qquad (1)$$

In the expression, "Exp" represents the exponential map of the 3D rotation group, which converts the value of the angular velocity to the rotation component. In Expression (1), "×" represents composition of a plurality of rotation components.

In the expression, $R(t+\Delta t)$ represents the rotation component of the self-position at the target time, $R(t)$ represents the rotation component of the self-position at the past time, $\omega(t)$ represents the measured angular velocity, $b_g$ represents the angular velocity bias as an estimation target, and $\Delta t$ represents the time difference between the past time and the target time. The first residual error can be calculated as, for example, the magnitude of the rotation angle of a rotation component obtained by synthesizing inverse rotation of the rotation component on the left-hand side of Expression (1) with the rotation component on the right-hand side of Expression (1).

The state-amount estimation unit 60 may substitute the rotation component of the self-position at each of a plurality of past times into the rotation-component motion equation of Expression (1) and estimate the angular velocity bias by the non-linear least-square method. In this case, the state-amount estimation unit 60 estimates the angular velocity bias, with which the first residual error is minimized, by repeatedly substituting the self-position at each of the plurality of past times into the rotation-component motion equation by using, for example, the Levenberg-Marquardt method, the Gauss-Newton method, or the conjugate gradient method. Thereby, the state-amount estimation unit 60 estimates the angular velocity bias that changes in time.

In addition, in the present embodiment, the state-amount estimation unit 60 estimates, as the state amount representing the state of the acceleration sensor 32, the speed of the moving object device 10 in the translation direction, the gravitational acceleration, and the acceleration bias representing the bias of the acceleration sensor 32.

For example, the state-amount estimation unit 60 estimates the speed in the translation direction, the gravitational acceleration, and the acceleration bias with which a residual error (second residual error) is minimized, the residual error being obtained when the translation component of the self-position at the past time is substituted into a translation-component motion equation. The translation-component motion equation is a relational expression for calculating the translation component of the self-position at the target time based on the translation component of the self-position at the past time.

Specifically, the translation-component motion equation is expressed by Expressions (2) and (3) below:

$$p(t+\Delta t)=p(t)+v(t)\times\Delta t+(\tfrac{1}{2})\times R(t)\times(a(t)-b_a)\times\Delta t^2 \qquad (2)$$

$$v(t+\Delta t)=v(t)+g\times\Delta t+R(t)\times(a(t)-b_a)\times\Delta t \qquad (3)$$

In the expression, $p(t+\Delta t)$ represents the translation component of the self-position at the target time, $p(t)$ represents the translation component of the self-position at the past time, $v(t)$ represents the speed as an estimation target, $\Delta t$ represents the time difference between the past time and the target time, g represents the gravitational acceleration as an estimation target, $b_a$ represents the acceleration bias as an estimation target, and $v(t+\Delta t)$ represents the speed at the target time. The second residual error can be calculated as, for example, a weighted sum of the magnitude of a vector obtained by subtracting the right-hand side of Expression (2) from the left-hand side of Expression (2) and the magnitude of a vector obtained by subtracting the right-hand side of Expression (3) from the left-hand side of Expression (3).

The state-amount estimation unit 60 may substitute the translation component of the self-position at each of a plurality of past times into the translation-component motion equation of Expressions (2) and (3) and estimate the speed, the gravitational acceleration, and the acceleration bias by the non-linear least-square method. In this case, the state-amount estimation unit 60 estimates the speed, the gravitational acceleration, and the acceleration bias with which the second residual error is minimized by repeatedly substituting the self-position at each of a plurality of past times into the translation-component motion equation by using, for example, the Levenberg-Marquardt method, the Gauss-Newton method, or the conjugate gradient method. Thereby, the state-amount estimation unit 60 estimates the speed, the gravitational acceleration, and the acceleration bias that change in time.

Subsequently, at S14, the confidence-degree calculation unit 62 calculates the confidence degree of the state amount of each of the one or more sensors 22.

The confidence-degree calculation unit 62 acquires a covariance matrix of the X-directional component, the Y-directional component, and the Z-directional component of the estimated angular velocity bias, which are orthogonal to each other. For example, the confidence-degree calculation unit 62 acquires the covariance matrix of the angular velocity bias, which is calculated by the state-amount estimation unit 60 in the process of calculation of the angular velocity bias by using the non-linear least-square method at S13. Then, the confidence-degree calculation unit 62 calculates, as the confidence degree of the angular velocity bias, the reciprocal of the sum of diagonal components of the acquired covariance matrix of the angular velocity bias.

In addition, the confidence-degree calculation unit 62 acquires a covariance matrix of the X-directional component, the Y-directional component, and the Z-directional component of the estimated acceleration bias, which are orthogonal to each other. For example, the confidence-degree calculation unit 62 acquires the covariance matrix of the acceleration bias, which is calculated by the state-amount estimation unit 60 in the process of calculation of the acceleration bias by using the non-linear least-square method at S13. Then, the confidence-degree calculation unit 62 calculates, as the confidence degree of the acceleration bias, the reciprocal of the sum of diagonal components of the acquired covariance matrix of the acceleration bias.

Subsequently, at S15, the self-position estimation unit 64 estimates the translation and rotation components of the self-position at the target time. The method of estimating the self-position at the target time will be described later with reference to FIGS. 5 and 6.

Subsequently, at S16, the self-position estimation unit 64 outputs the estimated self-position at the target time. For example, the self-position estimation unit 64 outputs the estimated self-position at the target time to the moving-object control device 27. In addition, the self-position estimation unit 64 stores the estimated self-position at the target time in the self-position storage unit 52 in association with time information.

The position estimation device 50 estimates the self-position at each predetermined time interval by repeatedly executing the above-described processing at S11 to S16 at each predetermined time interval.

Figure 5:
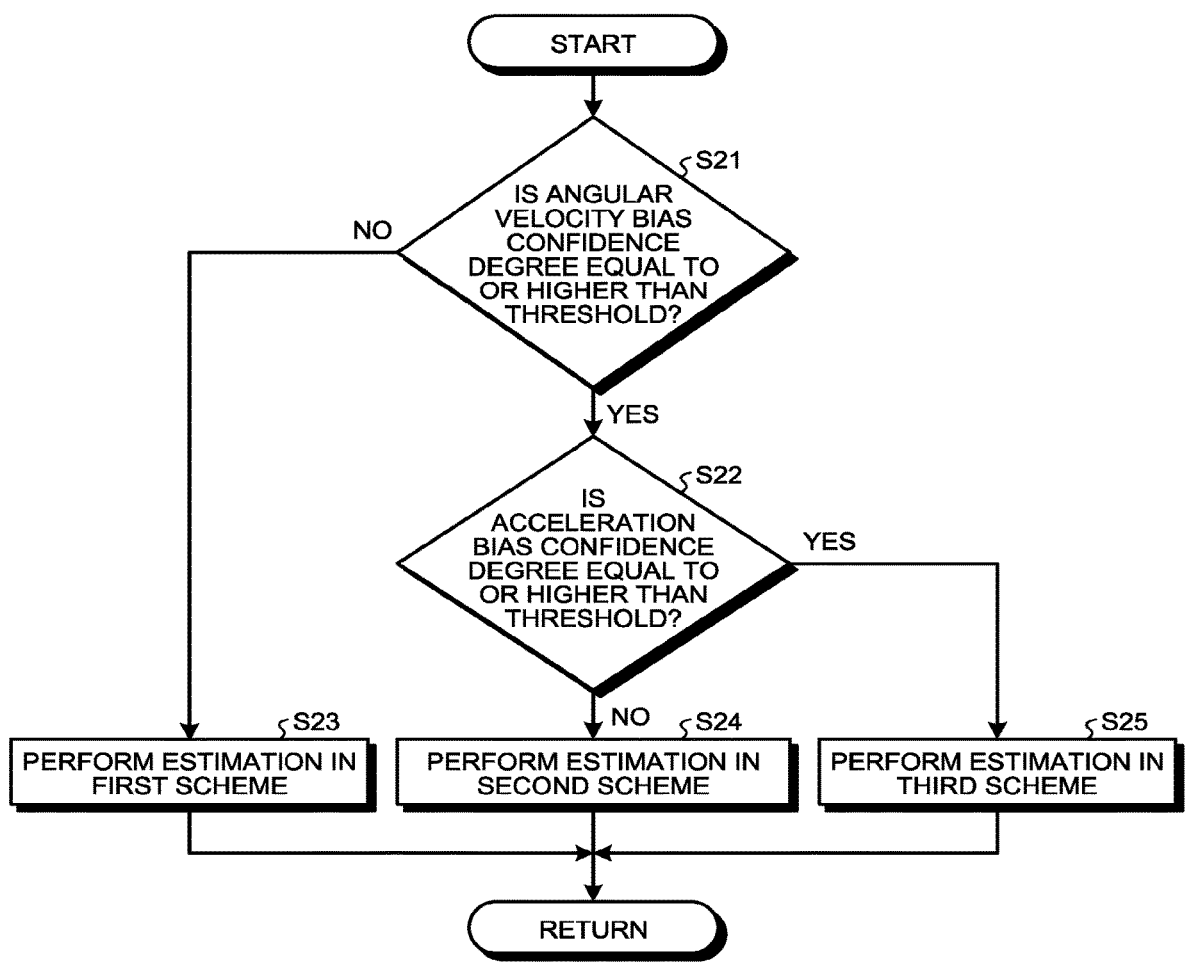
FIG. 5 is a flowchart illustrating a process at a self-position estimation unit.

FIG. 5 is a flowchart illustrating a process at the self-position estimation unit 64. In the present embodiment, the self-position estimation unit 64 executes processing through the process illustrated in FIG. 5.

Firstly, at S21, the self-position estimation unit 64 determines whether the confidence degree of the bias of the angular velocity is equal to or higher than a threshold set in advance. When the confidence degree of the angular velocity bias is not equal to or higher than the threshold (No at S21), the self-position estimation unit 64 advances the processing to S23. When the confidence degree of the angular velocity bias is equal to or higher than the threshold (Yes at S21), the self-position estimation unit 64 advances the processing to S22.

Subsequently, at S22, the self-position estimation unit 64 determines whether the confidence degree of the bias of the acceleration is equal to or higher than the threshold. When the confidence degree of the acceleration bias is not equal to or higher than the threshold (No at S22), the self-position estimation unit 64 advances the processing to S24. When the confidence degree of the acceleration bias is equal to or higher than the threshold (Yes at S22), the self-position estimation unit 64 advances the processing to S25.

At S23, the self-position estimation unit 64 estimates the self-position at the target time in a first scheme. Specifically, the self-position estimation unit 64 selects the first scheme when the confidence degree of the angular velocity bias is not equal to or higher than the threshold.

In the first scheme, the self-position estimation unit 64 estimates the self-position at the target time based on the captured image at the target time, the captured image at the past time, and the self-position at the past time. Thereby, the self-position estimation unit 64 estimates the self-position at the target time without using the observation value and state amount of each of the angular velocity sensor 31 and the acceleration sensor 32 when the confidence degree of the state amount of the angular velocity sensor 31 is not equal to or higher than the threshold.

More detailed processing contents of the first scheme will be described later with reference to FIG. 6. When the processing at S23 is completed, the self-position estimation unit 64 ends the processing of the present process.

At S24, the self-position estimation unit 64 estimates the self-position at the target time in a second scheme. Specifically, the self-position estimation unit 64 selects the second scheme when the confidence degree of the angular velocity bias is equal to or higher than the threshold but the confidence degree of the acceleration bias is not equal to or higher than the threshold.

In the second scheme, the self-position estimation unit 64 estimates the self-position at the target time based on the captured image at the target time, the measured angular velocity, the estimated angular velocity bias, the captured image at the past time, and the self-position at the past time. Thereby, the self-position estimation unit 64 selects, as a target sensor, the angular velocity sensor 31 whose confidence degree of the state amount is equal to or higher than the threshold, and estimates the self-position based on the observation value and the state amount of the selected angular velocity sensor 31.

More detailed processing contents of the second scheme will be described later with reference to FIG. 7. When the processing at S24 is completed, the self-position estimation unit 64 ends the processing of the present process.

At S25, the self-position estimation unit 64 estimates the self-position at the target time in a third scheme. Specifically, the self-position estimation unit 64 selects the third scheme, when the confidence degree of the angular velocity bias and the confidence degree of the acceleration bias are both equal to or higher than the threshold.

In the third scheme, the self-position estimation unit 64 estimates the self-position at the target time based on the captured image at the target time, the measured angular velocity, the estimated angular velocity bias, the measured acceleration, the estimated speed, the estimated gravitational acceleration, the estimated acceleration bias, the captured image at the past time, and the self-position at the past time. Thereby, the self-position estimation unit 64 selects, as target sensors, the angular velocity sensor 31 and the acceleration sensor 32 whose confidence degrees of the state amounts are equal to or higher than the threshold, and estimates the self-position based on the observation value and the state amount of each of the selected angular velocity sensor 31 and the selected acceleration sensor 32.

More detailed processing contents of the third scheme will be described later with reference to FIG. 8. When the processing at S25 is completed, the self-position estimation unit 64 ends the processing of the present process.

Figure 6:
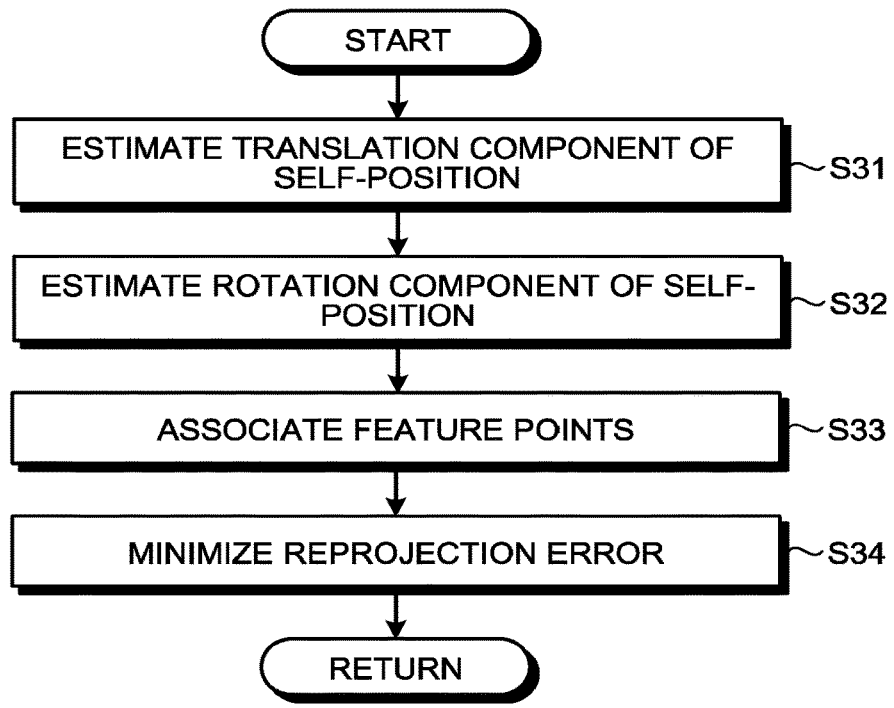
FIG. 6 is a flowchart illustrating the process of estimation processing in a first scheme.

FIG. 6 is a flowchart illustrating the process of the estimation processing in the first scheme at S23. The self-position estimation unit 64 executes, at S23, the processing illustrated in FIG. 6.

Firstly, at S31, the self-position estimation unit 64 estimates the translation component of the self-position at the target time based on the translation component of the self-position at the past time. For example, the self-position estimation unit 64 estimates the translation component of the self-position at the target time through extrapolation processing by applying the translation component of the self-position at each of a plurality of past times to a constant speed linear motion model. The self-position estimation unit 64 may calculate the translation component of the self-position at the target time by applying the translation component of the self-position at each of a plurality of past times to another model in place of the constant speed linear motion model. The self-position estimation unit 64 may calculate the translation component of the self-position at the target time by fitting a curve, such as a spline curve, to the translation component of the self-position at each of a plurality of past times.

Subsequently, at S32, the self-position estimation unit 64 estimates the rotation component of the self-position at the target time based on the rotation component of the self-position at the past time. For example, the self-position estimation unit 64 estimates the rotation component of the self-position at the target time through extrapolation processing by applying the rotation component of the self-position at each of a plurality of past times to an constant angular velocity motion model. The self-position estimation unit 64 may calculate the rotation component of the self-position at the target time by applying the rotation component of the self-position at each of a plurality of past times to another model in place of the equiangular velocity motion model. The self-position estimation unit 64 may calculate the rotation component of the self-position at the target time by fitting a curve, such as a spline curve, to the rotation component of the self-position at each of a plurality of past times.

Subsequently, at S33, the self-position estimation unit 64 associates each of one or more feature points included in the captured image at the target time with the corresponding feature point included in the captured image at the past time.

The self-position estimation unit 64 calculates the three-dimensional position of the corresponding feature point included in the captured image at the past time by using, for example, structure-from-motion or simultaneous localization and mapping (SLAM). The self-position estimation unit 64 projects the calculated three-dimensional position onto the captured image at the target time from the self-position at the target time, which is estimated at S31 and S32, and specifies a candidate position on the captured image at the target time. The self-position estimation unit 64 searches for similar texture in vicinity of the candidate position on the captured image at the target time, and associates a feature point included in the captured image at the target time with the corresponding feature point included in the captured image at the past time.

In addition, the self-position estimation unit 64 calculates, as an epipolar line, a candidate position at which the feature point included in the captured image at the past time exists based on the position of the feature point included in the captured image at the target time and the self-position estimated at S31 and S32. Then, the self-position estimation unit 64 may search for similar texture near the epipolar line of the captured image at the past time, and associate the feature point included in the captured image at the target time with the corresponding feature point included in the captured image at the past time.

The self-position estimation unit 64 calculates the similarity of texture based on, for example, the luminance value difference between peripheral regions of pixels. The self-position estimation unit 64 may calculate the similarity of texture based on a local characteristic descriptor such as SIFT, SURF, ORB, or AKAZE. Alternatively, the self-position estimation unit 64 may produces in advance a neural network for determining whether two local regions correspond to each other, and may calculate the similarity by using the neural network.

With respect to each of captured images at a plurality of past times, the self-position estimation unit 64 may associate each of one or more feature points included in the captured image at the target time with the corresponding feature point included in the captured image at the past time.

Subsequently, at S34, the self-position estimation unit 64 adjusts the self-position at the target time estimated at S31 and S32 to minimize a reprojection error. The reprojection error is the evaluation value of an error between the pixel position of each of the one or more feature points included in the captured image at the target time and a pixel position at which the three-dimensional position of the corresponding feature point included in the captured image at the past time is reprojected onto the captured image at the target time based on the estimated self-position at the target time. For example, the self-position estimation unit 64 uses the non-linear least-square method or the like when adjusting the self-position at the target time to minimize the reprojection error.

Then, the self-position estimation unit 64 outputs the self-position at the target time adjusted at S34. After having completed S34, the self-position estimation unit 64 ends the present process.

Figure 7:
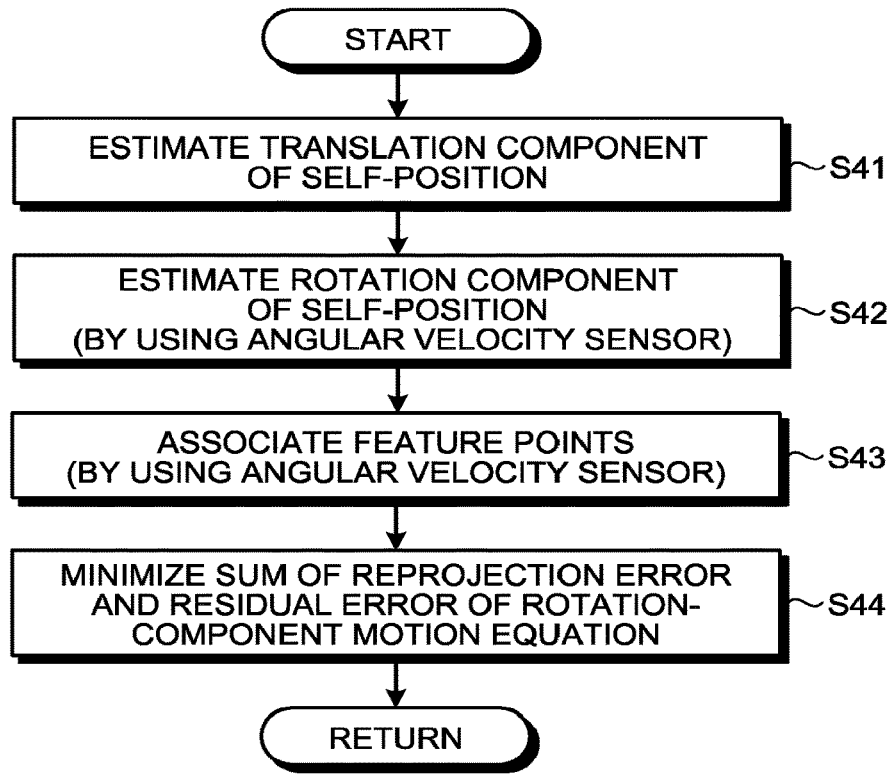
FIG. 7 is a flowchart illustrating the process of estimation processing in a second scheme.

FIG. 7 is a flowchart illustrating the process of the estimation processing in the second scheme at S24. The self-position estimation unit 64 executes, at S24, the processing illustrated in FIG. 7.

Firstly, at S41, the self-position estimation unit 64 estimates the translation component of the self-position at the target time based on the translation component of the self-position at the past time. For example, the self-position estimation unit 64 executes, at S41, processing the same as that at S31 in FIG. 6.

Subsequently, at S42, the self-position estimation unit 64 estimates the rotation component of the self-position at the target time based on the rotation component of the self-position at the past time, the measured angular velocity, and the estimated angular velocity bias. More specifically, the self-position estimation unit 64 calculates the rotation component of the self-position at the target time by substituting the rotation component of the self-position at the past time, the measured angular velocity, and the estimated angular velocity bias into the rotation-component motion equation in the foregoing Expression (1). At S42, in place of the above-described processing, the self-position estimation unit 64 may execute processing the same as that at S32 in FIG. 6.

Subsequently, at S43, the self-position estimation unit 64 associates each of the one or more feature points included in the captured image at the target time with the corresponding feature point included in the captured image at the past time. For example, the self-position estimation unit 64 executes, at S43, processing the same as that at S33 in FIG. 6.

Alternatively, at S43, the self-position estimation unit 64 may predict feature point rotation based on the rotation-component motion equation in the foregoing Expression (1), and may deform an image of a region around the feature point in the captured image at the past time in the rotational direction before calculating the similarity of texture. Thereby, the self-position estimation unit 64 can accurately execute the feature point association.

Subsequently, at S44, the self-position estimation unit 64 adjusts the self-position at the target time estimated at S41 and S42 to minimize the sum of the reprojection error and the first residual error in the rotation-component motion equation. The first residual error in the rotation-component motion equation is the evaluation value of the residual error obtained when the rotation component of the self-position at the past time, the measured angular velocity, and the estimated angular velocity bias are substituted into the rotation-component motion equation.

The self-position estimation unit 64 uses, for example, the non-linear least-square method or the like when adjusting the self-position at the target time to minimize the sum of the reprojection error and the first residual error. The reprojection error and the first residual error in the rotation-component motion equation have different units. Thus, the self-position estimation unit 64 may normalize each of the reprojection error and the first residual error before calculating the sum.

The self-position estimation unit 64 fixes the state amount (in this example, the angular velocity bias) when adjusting the self-position at the target time. Instead, the self-position estimation unit 64 may perform adjustment to minimize both the state amount and the self-position at the target time.

Then, the self-position estimation unit 64 outputs the self-position at the target time adjusted at S44. After having completed S44, the self-position estimation unit 64 ends the present process.

Figure 8:
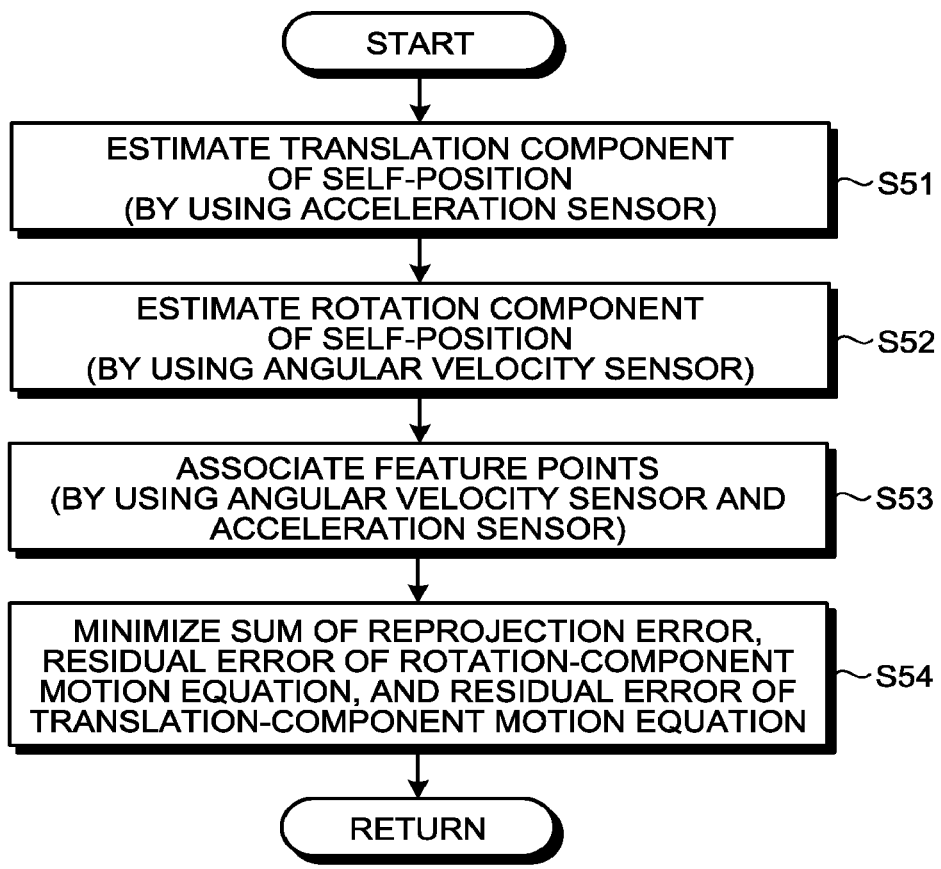
FIG. 8 is a flowchart illustrating the process of estimation processing in a third scheme.

FIG. 8 is a flowchart illustrating the process of the estimation processing in the third scheme at S25. The self-position estimation unit 64 executes, at S25, the processing illustrated in FIG. 8.

Firstly, at S51, the self-position estimation unit 64 estimates the translation component of the self-position at the target time based on the translation component of the self-position at the past time, the measured acceleration, the estimated speed, the estimated gravitational acceleration, and the estimated acceleration bias. More specifically, the self-position estimation unit 64 calculates the translation component of the self-position at the target time by substituting the translation component of the self-position at the past time, the estimated speed, the estimated gravitational acceleration, and the estimated acceleration bias into the translation-component motion equation in Expressions (2) and (3). At S51, in place of the above-described processing, the self-position estimation unit 64 may execute processing the same as that at S31 in FIG. 6.

Subsequently, at S52, the self-position estimation unit 64 estimates the rotation component of the self-position at the target time based on the rotation component of the self-position at the past time, the measured angular velocity, and the estimated angular velocity bias. More specifically, the self-position estimation unit 64 calculates the rotation component of the self-position at the target time by substituting the rotation component of the self-position at the past time, the measured angular velocity, and the estimated angular velocity bias into the rotation-component motion equation in Expression (1). At S52, in place of the above-described processing, the self-position estimation unit 64 may execute processing the same as that at S32 in FIG. 6.

Subsequently, at S53, the self-position estimation unit 64 associates each of the one or more feature points included in the captured image at the target time with the corresponding feature point included in the captured image at the past time. For example, the self-position estimation unit 64 executes, at S53, processing the same as that at S33 in FIG. 6.

Alternatively, at S53, the self-position estimation unit 64 may deform, based on the direction of the estimated gravitational acceleration, the image of the region around the feature point in the captured image at the past time so that directions of the gravitational acceleration in the captured image at the target time and the captured image at the past time are aligned with each other, before calculating the similarity of texture. Thereby, the self-position estimation unit 64 can accurately execute the feature point association.

At S53, instead of the above processing, the self-position estimation unit 64 may predict feature point rotation based on the rotation-component motion equation in the foregoing Expression (1), and may deform the image of the region around the feature point in the captured image at the past time in the rotational direction before calculating the similarity of texture. In this manner as well, the self-position estimation unit 64 can accurately execute the feature point association.

Furthermore, at S53, the self-position estimation unit 64 may combine the alignment of the direction of the gravitational acceleration and the prediction of the feature point rotation, and may deform the image of the region around the feature point in the captured image at the past time in the rotational direction before calculating the similarity of texture.

Subsequently, at S54, the self-position estimation unit 64 adjusts the self-position at the target time estimated at S51 and S52 to minimize the sum of the reprojection error, the first residual error in the rotation-component motion equation, and the second residual error in the translation-component motion equation. The second residual error in the translation-component motion equation is the evaluation value of the residual error obtained when the translation component of the self-position at the past time, the measured acceleration, the estimated speed, the estimated gravitational acceleration, and the estimated acceleration bias are substituted into the translation-component motion equation.

The self-position estimation unit 64 uses, for example, the non-linear least-square method or the like when adjusting the self-position at the target time to minimize the sum of the reprojection error, the first residual error, and the second residual error. The reprojection error, the first residual error, and the second residual error have different units. Thus, the self-position estimation unit 64 may normalize each of the reprojection error, the first residual error, and the second residual error before calculating the sum.

The self-position estimation unit 64 fixes the state amounts (in this example, the angular velocity bias, the speed, the gravitational acceleration, and the angular velocity bias) when adjusting the self-position at the target time. Instead, the self-position estimation unit 64 may perform adjustment to minimize both any one or more the state amounts and the self-position at the target time.

Then, the self-position estimation unit 64 outputs the self-position at the target time adjusted at S54. After having completed S54, the self-position estimation unit 64 ends the present process.

The first scheme, the second scheme, and the third scheme described above each include the four pieces of processing of the estimation processing of the translation component of the self-position (S31, S41, and S51), the estimation processing of the rotation component of the self-position (S32, S42, and S52), the feature point association processing (S33, S43, and S53), and the self-position adjustment processing (S34, S44, and S54).

The self-position estimation unit 64 may share any of the four pieces of processing among the first scheme, the second scheme, and the third scheme, and switch the other pieces of processing in accordance with the confidence degree of the state amount. For example, the self-position estimation unit 64 may share the feature point association processing in the processing at S33, and switch the estimation processing of the translation component of the self-position, the estimation processing of the rotation component of the self-position, and the self-position adjustment processing in accordance with the confidence degree of the state amount.

FIG. 9 is a diagram illustrating the configuration of the position estimation device 50 according to a modification. In addition to the configuration illustrated in FIG. 3, the position estimation device 50 may further include a motion-kind specification unit 74, an anomaly determination unit 76, and a resetting unit 78.

The motion-kind specification unit 74 specifies a kind of motion of the moving object device 10 based on a trajectory of the estimated self-position. For example, the motion-kind specification unit 74 specifies whether the moving object device 10 is performing constant-speed linear motion, performing constant-acceleration linear motion, performing circular motion, or is stationary. For example, when the moving object device 10 is performing motion other than motion kinds set in advance, the motion-kind specification unit 74 may specify that the moving object device 10 is performing the other motion.

The motion-kind specification unit 74 specifies the motion kind by, for example, evaluating the residual error between the trajectory of the estimated self-position and each of a plurality of models described in advance. When the residual error between the trajectory of the self-position and any of the plurality of models is equal to or larger than a threshold, the motion-kind specification unit 74 specifies that the moving object device 10 is performing other motion. When the residual error from the trajectory of the self-position is smaller than the threshold for a plurality of models, the motion-kind specification unit 74 may specify a plurality of motion kinds. The motion-kind specification unit 74 may specify the motion kind by using a classification means such as a neural network.

The anomaly determination unit 76 acquires the motion kind specified by the motion-kind specification unit 74. In addition, the anomaly determination unit 76 acquires one or more target sensors selected by the self-position estimation unit 64 to estimate the self-position. In other words, the anomaly determination unit 76 acquires a combination of the sensors 22 whose estimated confidence degrees of the state amounts are relatively high. In the present embodiment, the anomaly determination unit 76 acquires which of the first scheme, the second scheme, and the third scheme is selected.

Subsequently, the anomaly determination unit 76 determines whether the combination of the one or more selected target sensors correspond to the specified motion kind, and determines that the operation is anomalous when no correspondence is obtained or that the operation is normal when the correspondence is obtained. In the present embodiment, the anomaly determination unit 76 determines whether the selected scheme corresponds to the specified motion kind, and determines that the operation is anomalous when no correspondence is obtained or that the operation is normal when the correspondence is obtained.

The anomaly determination unit 76 stores in advance an expected pattern of a selected scheme for each motion kind, for example. Then, when matching is made with the stored pattern, the anomaly determination unit 76 determines that the selected scheme corresponds to the specified motion kind.

Here, a situation is assumed, in which the motion kind is constant-speed linear motion. In this situation, since the acceleration is zero, it is difficult for the state-amount estimation unit 60 to estimate the speed. Thus, the selected scheme is expected to be the first scheme or the second scheme but not the third scheme that uses the acceleration, the angular velocity, and the captured image. In this situation, when the third scheme is selected, it is thought that anomaly is occurring in acquisition of the observation value of the sensor 22 or in calculation and the like for the self-position estimation.

Thus, in the case where the motion kind is constant-speed linear motion and the third scheme is selected, the anomaly determination unit 76 determines that the operation is anomalous. In contrast, the anomaly determination unit 76 determines that the operation is normal when the motion kind is constant-speed linear motion and either the first scheme or the second scheme is selected. The anomaly determination unit 76 may determine that the operation is normal when another motion kind is specified and any scheme is selected. When a plurality of motion kinds are specified, the anomaly determination unit 76 determines whether each of the plurality of specified motion kinds corresponds to the motion kind specified by the selected scheme, and integrates determination results of the plurality of specified motion kinds to determine whether the operation is anomalous.

When the anomaly determination unit 76 determines that the operation is anomalous, the resetting unit 78 resets the self-position at the past time so that the self-position estimation unit 64 newly estimates the self-position at the target time. For example, when the anomaly determination unit 76 determines that the operation is anomalous, the resetting unit 78 sets the current self-position as a reference point so that the self-position estimation unit 64 newly estimates the self-position at the target time. Thereby, the self-position estimation unit 64 can newly estimate the self-position by using the self-position at the past time when the operation is determined to be normal.

The position estimation device 50 according to the modification described above can evaluate the relation between the selected self-position estimation scheme and the estimated self-position. Then, the position estimation device 50 can perform self-diagnosis of whether the estimation operation at the position estimation device 50 is anomalous based on a result of the evaluation of the relation between the estimation scheme and the estimated self-position.

Furthermore, the position estimation device 50 according to the modification can newly estimate the self-position based on a result of the self-diagnosis. Accordingly, the self-position can be more accurately estimated by the position estimation device 50 according to the modification.

As described above, the position estimation device 50 according to the present embodiment estimates the state amount representing the state of each of the one or more sensors 22, and calculates the confidence degree of the state amount of each of the one or more sensors 22. Then, the position estimation device 50 selects one or more target sensors from among the one or more sensors 22 based on the confidence degree of the state amount of each of the one or more sensors 22, and estimates the self-position based on the observation value and the state amount of each of the one or more selected target sensors.

Therefore, the position estimation device 50 is capable of avoiding degradation of the accuracy of the self-position estimation due to use of the state amount whose confidence degree is relatively low. Thus, the position estimation device 50 can accurately estimate the self-position of the moving object device 10 by using the observation value and the state amount of each sensor 22 whose confidence degree of the state amount is relatively high.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A position estimation device provided for estimating a self-position of a moving object device provided with one or more sensors for observing information related to movement, the position estimation device comprising:
one or more hardware processors configured to:
estimate a state amount representing a state of each of the one or more sensors based on an observation value of the corresponding sensor;
calculate a confidence degree representing a degree of confidence of the state amount of each of the one or more sensors;
select one or more target sensors from among the one or more sensors based on the confidence degree of the state amount of each of the one or more sensors; and
estimate the self-position based on the observation value and the state amount of each of the selected one or more target sensors, wherein
the one or more hardware processors estimate, for each of the one or more sensors, the state amount with which a residual error is minimized, the residual error being obtained when the self-position at each of one or more of past times is substituted into a predetermined relational expression, and
the relational expression is an equation for calculating the self-position at a target time based on the self-position at the past time, the observation value of a corresponding sensor, the state amount of the corresponding sensor, and a time difference between the past time and the target time.

2. The device according to claim 1, wherein
the moving object device is further provided with an image capturing device capturing an image of vicinity of the moving object device, and,
when the one or more sensors include one or more target sensors whose confidence degrees are equal to or higher than a predetermined threshold, the one or more hardware processors
select, as the one or more target sensors from among the one or more sensors, one or more sensors whose confidence degrees of the state amounts are equal to or higher than the threshold, and
estimate the self-position at the target time based on
a captured image captured by the image capturing device at the target time,
the captured image at a past time before the target time,
the self-position at the past time, and
the observation value and the state amount of each of the selected one or more target sensors.

3. The device according to claim 2, wherein, when the one or more sensors include none of the one or more sensors whose confidence degrees are equal to or higher than the threshold, the one or more hardware processors estimate the self-position at the target time based on the captured image at the target time, the captured image at the past time, and the self-position at the past time.

4. The device according to claim 1, wherein the one or more hardware processors
   estimate the state amount by a non-linear least-square method,
   acquire a covariance matrix of a plurality of different components of the estimated state amount, and
   calculate, as the confidence degree, reciprocal of a sum of diagonal components of the acquired covariance matrix.

5. The device according to claim 1, wherein
   the moving object device further includes a second sensor for observing an observation value corresponding to the state amount, and
   the one or more hardware processors calculate the confidence degree by comparing the observation value of the second sensor with the estimated state amount.

6. The device according to claim 3, wherein
   the self-position includes a translation component and a rotation component,
   the one or more sensors include an angular velocity sensor and an acceleration sensor,
   the angular velocity sensor measures angular velocity of the moving object device at the target time, and
   the acceleration sensor measures acceleration of the moving object device at the target time.

7. The device according to claim 6, wherein the one or more hardware processors
   estimate, as the state amount of the angular velocity sensor, an angular velocity bias of the moving object device, and
   estimate, as the state amount of the acceleration sensor, speed and gravitational acceleration of the moving object device and an acceleration bias of the moving object device.

8. The device according to claim 7, wherein the one or more hardware processors
   estimate the self-position at the target time based on
      a first scheme in which the self-position at the target time is estimated based on the captured image at the target time, the captured image at the past time, and the self-position at the past time,
      a second scheme in which the self-position at the target time is estimated based on the captured image at the target time, the measured angular velocity, the estimated angular velocity bias, the captured image at the past time, and the self-position at the past time, or
      a third scheme in which the self-position at the target time is estimated based on the captured image at the target time, the measured angular velocity, the estimated angular velocity bias, the measured acceleration, the estimated speed, the estimated gravitational acceleration, the estimated acceleration bias, the captured image at the past time, and the self-position at the past time,
   select the first scheme when the confidence degree of the angular velocity bias is not equal to or higher than the threshold,
   select the second scheme when the confidence degree of the angular velocity bias is equal to or higher than the threshold and the confidence degree of the acceleration bias is not equal to or higher than the threshold, and
   select the third scheme when the confidence degree of the angular velocity bias and the confidence degree of the acceleration bias are both equal to or higher than the threshold.

9. The device according to claim 8, wherein, when the first scheme is selected, the one or more hardware processors
   estimate the self-position at the target time based on the self-position at the past time,
   associate each of one or more feature points included in the captured image at the target time with a corresponding feature point included in the captured image at the past time based on the estimated self-position at the target time, and
   adjust the estimated self-position at the target time to minimize a reprojection error, the reprojection error representing an evaluation value of an error between a pixel position of each of the one or more feature points included in the captured image at the target time and a pixel position at which the corresponding feature point included in the captured image at the past time is reprojected onto the captured image at the target time based on the estimated self-position at the target time.

10. The device according to claim 9, wherein, when the second scheme is selected, the one or more hardware processors
    estimate a translation component of the self-position at the target time based on a translation component of the self-position at the past time,
    estimate a rotation component of the self-position at the target time based on a rotation component of the self-position at the past time, the measured angular velocity, and the estimated angular velocity bias,
    associate each of one or more feature points included in the captured image at the target time with the corresponding feature point included in the captured image at the past time based on the estimated self-position at the target time, and
    adjust the estimated self-position at the target time to minimize a sum of the reprojection error and a first residual error in a rotation-component motion equation, the first residual error in the rotation-component motion equation representing an evaluation value of a residual error obtained when a rotation component of the self-position at the past time, the measured angular velocity, and the estimated angular velocity bias are substituted into the rotation-component motion equation.

11. The device according to claim 10, wherein, when the third scheme is selected, the one or more hardware processors
    estimate the translation component of the self-position at the target time based on the translation component of the self-position at the past time, the measured acceleration, the estimated speed, the estimated gravitational acceleration, and the estimated acceleration bias,
    estimate the rotation component of the self-position at the target time based on the rotation component of the self-position at the past time, the measured angular velocity, and the estimated angular velocity bias,
    associate each of one or more feature points included in the captured image at the target time with the corresponding feature point included in the captured image at the past time based on the estimated self-position at the target time, and
    adjust the estimated self-position at the target time to minimize a sum of the reprojection error, the first residual error in the rotation-component motion equation, and a second residual error in a translation-component motion equation, the second residual error in the translation-component motion equation representing an evaluation value of a residual error obtained when the translation component of the self-position at the past time, the measured acceleration, the estimated speed, the estimated gravitational acceleration, and the estimated acceleration bias are substituted into the translation-component motion equation.

12. The device according to claim 11, wherein
the one or more hardware processors estimate the angular velocity bias with which the first residual error is minimized, the first residual error being obtained when the rotation component of the self-position at the past time is substituted into the rotation-component motion equation, and
the rotation-component motion equation is expressed by Expression (1) below:

$$R(t+\Delta t)=R(t)\times \text{Exp}(\omega(t)-b_g)\Delta t \quad (1)$$

where
R(t+Δt) represents the rotation component of the self-position at the target time,
R(t) represents the rotation component of the self-position at the past time,
ω(t) represents the measured angular velocity,
$b_g$ represents the angular velocity bias, and
Δt represents a time difference between the past time and the target time.

13. The device according to claim 12, wherein the one or more hardware processors
estimate the angular velocity bias by a non-linear least-square method by substituting the rotation component of the self-position at each of a plurality of the past times into the rotation-component motion equation,
acquire a covariance matrix of an X-directional component, a Y-directional component, and a Z-directional component of the angular velocity bias, which are orthogonal to each other, and
calculate, as the confidence degree of the angular velocity bias, reciprocal of a sum of diagonal components of the acquired covariance matrix.

14. The device according to claim 12, wherein
the one or more hardware processors estimate the speed, the gravitational acceleration, and the acceleration bias with which the second residual error is minimized, the second residual error being obtained when the translation component of the self-position at the past time is substituted into the translation-component motion equation, and
the translation-component motion equation is expressed by Expressions (2) and (3) below:

$$p(t+\Delta t)=p(t)+v(t)\times \Delta t+(\tfrac{1}{2})\times R(t)\times(a(t)-b_a)\times \Delta t^2 \quad (2)$$

$$v(t+\Delta t)=v(t)+g\times \Delta t+R(t)\times(a(t)-b_a)\times \Delta t \quad (3)$$

where
p(t+Δt) represents the translation component of the self-position at the target time,
p(t) represents the translation component of the self-position at the past time,
v(t) represents the speed,
Δt represents the time difference between the past time and the target time,
g represents the gravitational acceleration,
a(t) represents the measured acceleration,
$b_a$ represents the acceleration bias, and
v(t+Δt) represents the speed at the target time.

15. The device according to claim 14, wherein the one or more hardware processors
estimate the acceleration bias by a non-linear least-square method by substituting the translation component of the self-position at each of a plurality of the past times into the translation-component motion equation,
acquire a covariance matrix of an X-directional component, a Y-directional component, and a Z-directional component of the acceleration bias, which are orthogonal to each other, and
calculate, as the confidence degree of the acceleration bias, reciprocal of a sum of diagonal components of the acquired covariance matrix.

16. The device according to claim 2, the one or more hardware processors
specify a motion kind of the moving object device based on a trajectory of the estimated self-position,
determine whether a combination of the selected one or more target sensors corresponds to the specified motion kind, and
determine that an anomaly has occurred when the combination does not correspond to the specified motion kind.

17. A moving-object control system comprising:
a position estimation device configured to estimate a self-position of a moving object device provided with one or more sensors for observing information related to movement; and
a moving-object control device configured to control movement of the moving object device based on the estimated self-position,
wherein the position estimation device
estimates a state amount representing a state of each of the one or more sensors based on an observation value of the corresponding sensor,
calculates a confidence degree representing a degree of confidence of the state amount of each of the one or more sensors,
selects one or more target sensors from among the one or more sensors based on the confidence degree of the state amount of each of the one or more sensors, and
estimates the self-position based on the observation value and the state amount of each of the selected one or more target sensors, wherein
the one or more hardware processors estimate, for each of the one or more sensors, the state amount with which a residual error is minimized, the residual error being obtained when the self-position at each of one or more of past times is substituted into a predetermined relational expression, and
the relational expression is an equation for calculating the self-position at a target time based on the self-position at the past time, the observation value of a corresponding sensor, the state amount of the corresponding sensor, and a time difference between the past time and the target time.

18. A position estimation method implemented by a computer to estimate a self-position of a moving object device provided with one or more sensors for observing information related to movement, the method comprising:
estimating a state amount representing a state of each of the one or more sensors based on an observation value of the corresponding sensor;
calculating a confidence degree representing a degree of confidence of the state amount of each of the one or more sensors;
selecting one or more target sensors from among the one or more sensors based on the confidence degree of the state amount of each of the one or more sensors; and estimating the self-position based on the observation value and the state amount of each of the selected one or more target sensors, wherein the method further comprising estimating, for each of the one or more sensors, the state amount with which a residual error is minimized, the residual error being obtained when the self-position at each of one or more of past times is substituted into a predetermined relational expression, and the relational expression is an equation for calculating the self-position at a target time based on the self-position at the past time, the observation value of a corresponding sensor, the state amount of the corresponding sensor, and a time difference between the past time and the target time.

19. A computer program product comprising a non-transitory computer-readable recording medium on which an executable program is recorded, the program being executed by a computer to estimate a self-position of a moving object device provided with one or more sensors for observing information related to movement, the program instructing the computer to:

estimate a state amount representing a state of each of the one or more sensors based on an observation value of the corresponding sensor;

calculate a confidence degree representing a degree of confidence of the state amount of each of the one or more sensors;

select one or more target sensors from among the one or more sensors based on the confidence degree of the state amount of each of the one or more sensors; and estimate the self-position based on the observation value and the state amount of each of the selected one or more target sensors, wherein the program further instructing the computer to estimate, for each of the one or more sensors, the state amount with which a residual error is minimized, the residual error being obtained when the self-position at each of one or more of past times is substituted into a predetermined relational expression, and the relational expression is an equation for calculating the self-position at a target time based on the self-position at the past time, the observation value of a corresponding sensor, the state amount of the corresponding sensor, and a time difference between the past time and the target time.

* * * * *